(12) United States Patent
Fujiike et al.

(10) Patent No.: US 6,232,022 B1
(45) Date of Patent: May 15, 2001

(54) METHOD FOR MANUFACTURING A COLOR FILTER, AND A LIQUID-CRYSTAL DEVICE USING A COLOR FILTER MANUFACTURED BY THE METHOD

(75) Inventors: Hiroshi Fujiike, Yokohama; Yoshitomo Marumoto; Satoshi Hayashi, both of Kawasaki, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/390,475

(22) Filed: Sep. 3, 1999

(30) Foreign Application Priority Data

Sep. 9, 1998 (JP) .................................................. 10-254460

(51) Int. Cl.⁷ ............................ G02B 5/20; G02F 1/1335
(52) U.S. Cl. ................................ 430/7; 349/106; 347/107
(58) Field of Search ................................ 430/7; 349/106; 347/106, 107

(56) References Cited

U.S. PATENT DOCUMENTS 5,670,205 * 9/1997 Miyazaki et al. ..................... 427/64
5,726,724 * 3/1998 Shirota et al. ....................... 349/106

FOREIGN PATENT DOCUMENTS 8-292310 * 11/1996 (JP) .
9-281324    10/1997 (JP) .

* cited by examiner

*Primary Examiner*—John A. McPherson
(74) *Attorney, Agent, or Firm*—Fitzpatrick, Cella, Harper & Scinto

(57) ABSTRACT

A method for manufacturing a color filter including a black matrix having apertures, and pixels obtained by coloring the aperatures on a substrate includes the step of correcting coloring conditions for the color filter based on a distribution of areas of the respective apertures. A liquid-crystal device includes a color filter manufactured by the method, a facing substrate facing the color filter, and a liquid crystal sealed between the color filter and the facing substrate.

21 Claims, 11 Drawing Sheets

METHOD FOR MANUFACTURING A COLOR FILTER, AND A LIQUID-CRYSTAL DEVICE USING A COLOR FILTER MANUFACTURED BY THE METHOD

BACKGROUND OF THE INVENTION

1. Field of the Invention

The present invention relates to a method for manufacturing a color filter applicable to a color liquid-crystal display used for a color television, a personal computer, a car navigation system, a small-size television or the like, and to a liquid-crystal device using a color filter manufactured by the method.

2. Description of the Related Art

Recently, in accordance with development of personal computers, particularly, portable personal computers, there is an increasing demand for liquid-crystal displays, particularly, color liquid-crystal displays. However, in order to realize further diffusion of such displays, it is necessary to reduce the production cost of the displays. Particularly, there is an increasing request for cost reduction of color filters whose cost occupies a considerable part of the cost of the displays.

Various approaches have been tried in order to respond to the above-described request while satisfying characteristics required for color filters. The first task in color-filter manufacturing methods is to uiformly color each pixel (a colored portion) of a color filter. Namely, it is necessary to make the amount of a coloring material per unit area for each pixel uniform.

Conventionally, in a pigment dispersion method which is widely used as a color-filter manufacturing method, the amount of a coloring material per unit area of a colored portion is made uniform by making the thickness of a film forming the colored portion constant. Recently, color-filter manufacturing methods according to an ink-jet method have been proposed, and various proposals for making the degree of coloring for each pixel uniform have been provided, for example, in Japanese Patent Laid-Open Application (Kokai) No. 9-281324 (1997), and the like. More specifically, the amount of discharged ink from each nozzle is obtained by discharging in advance ink from nozzles of an ink-jet head onto a medium, and the amount of supplied ink per unit area in the entire colored portion of a color filter is made constant based on the obtained result.

The assignee of the present application has proposed a method for making an optical effect of each pixel uniform. This method intends to reduce unevenness in color which is considered occur due, for example, to a difference in the distribution of coloring within a pixel depending on a position within a colored region. The optical effect indicates the density of coloring of a pixel. More specifically, the optical density is a physical amount related to the density of coloring. It is considered to be rational to use the radiant flux of light passing through each pixel when projecting light in the same condition as in the actual state of use of the concerned color filter as this physical amount. Actually, although illumination for a color filter is not entirely identical for each pixel, the illumination may, in many cases, be dealt with as substantially identical. In such cases, the radiant flux of light passing through each pixel for a constant amount of incident light is used as the above-described physical amount.

However, when measuring the radiant flux of light passing through each pixel in order to make the optical effect uniform, if the area of an aperture of a black matrix differs, the radiant flux of light passing through a pixel differs and therefore the optical effect differs even for the same density of coloring. Accordingly, even if coloring conditions are corrected so as to provide a uniform optical effect in the measured color filter, the optical effect differs when the area of an aperture of a black matrix differs in a color filter to be newly colored.

SUMMARY OF THE INVENTION

It is an object of the present invention to provide a method for manufacturing a color filter which does not have unevenness in color by exactly correcting coloring conditions in consideration of influence of the distribution of the areas of respective apertures of a black matrix.

It is another object of the present invention to provide a liquid-crystal device using a color filter manufactured by the above-described manufacturing method.

According to one aspect of the present invention, a method for manufacturing a color filter including a black matrix having apertures on a substrate, and pixels obtained by coloring the aperatures includes the step of correcting coloring conditions for the color filter based on a distribution of areas of the respective apertures.

In the present invention, by taking into consideration of the distribution of the areas of respective apertures of a black matrix for the optical effect of each pixel of a color filter, it is possible to improve unevenness in color due to the distribution of the areas of the respective aperatures of the black matrix.

In the present invention, by estimating the areas of respective apertures of a black matrix of a color filter, means for or a step of measuring the areas of the respective apertures of the black matrix becomes unnecessary, and therefore a manufacturing process can be simplified.

Particularly, when the filter is manufactured by dividing a region to be colored into a plurality of scanning regions, and each of the scanning regions is colored with the same conditions, the difference between measured values of the optical effect of pixels having the same coloring conditions reflects the difference between the areas of respective apertures. Hence, the area of an aperture can be estimated by comparing the measured values. It is also possible to determine the area of the aperture of a pixel positioned between these pixels by linear interpolation using the measured values. When coloring a region by dividing it into a plurality of scanning regions, unevenness in color tends to appear at the border between adjacent scanning regions. According to the present invention, however, such unevenness in color can be improved.

According to another aspect of the present invention, a liquid-crystal device includes a color filter manufactured by the above-described method, a facing substrate facing the color filter, and a liquid crystal sealed between the color filter and the facing substrate.

The foregoing and other objects, advantages and features of the present invention will become more apparent from the following description of the present invention taken in conjunction with the accompanying drawings.

DETAILED DESCRIPTION OF THE INVENTION

In a color-filter manufacturing method according to a first embodiment of the present invention, an optical effect, and the distribution of areas of respective apertures of a color filter are obtained. By removing influence of the distribution of the areas of the respective apertures from the optical effect, coloring conditions for the color filter so as to provide less unevenness in color are specified.

Figure 1:
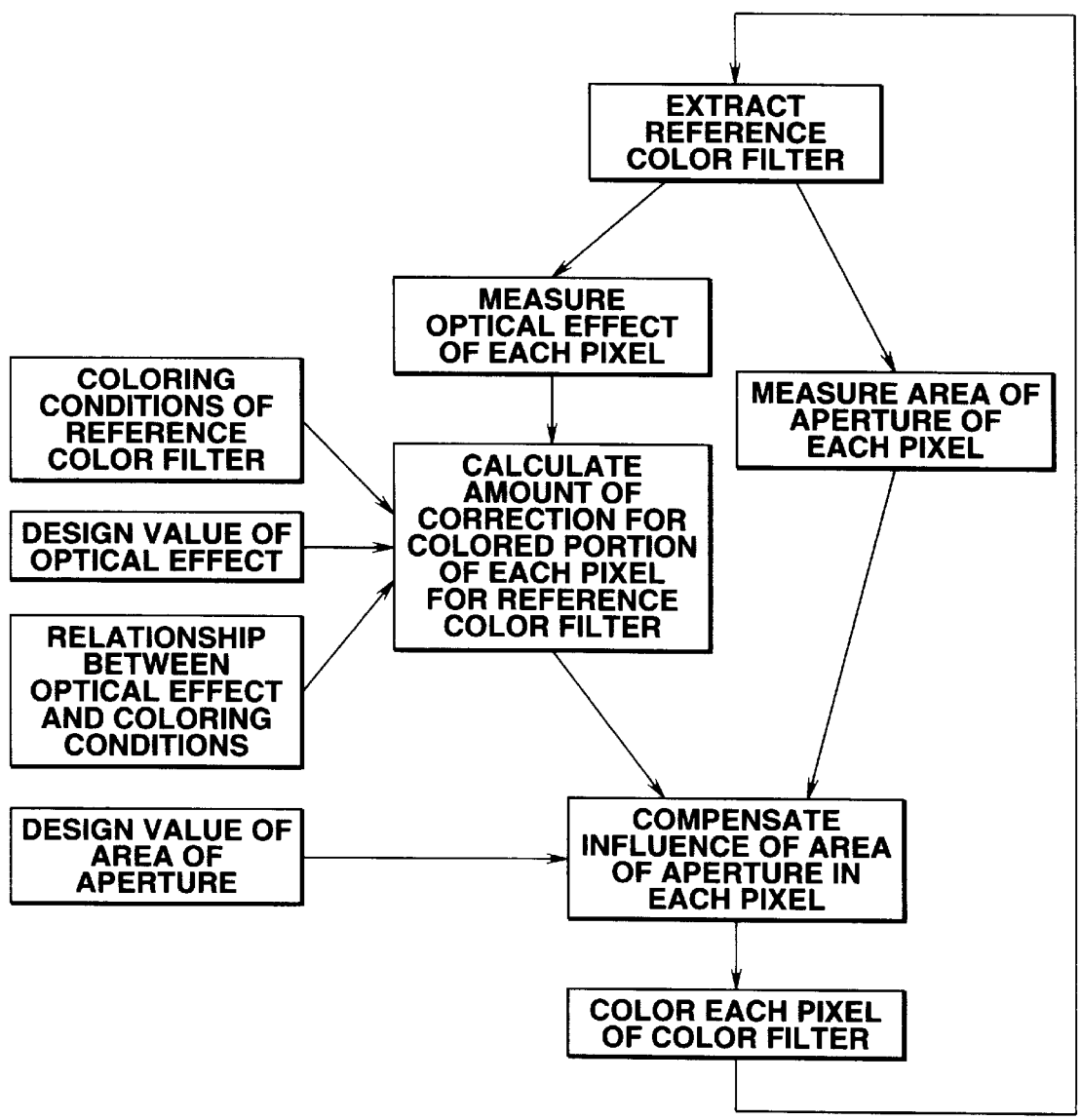
FIG. 1 is a flowchart illustrating the basic processes of a color-filter manufacturing method according to a first embodiment of the present invention.

A color-filter manufacturing method according to the first embodiment will now be described with reference to the flowchart shown in FIG. 1.

First, a reference color filter is extracted from actually manufactured color filters. This reference color filter may thereafter be shipped as a product.

Next, the optical effect of each pixel of the reference color filter is obtained. As described above, the radiant flux of light passing through each pixel for constant incident light is generally used and is preferably used in the present invention as the optical effect. However, from the gist of the present invention, any physical amount relating to the density of coloring of each pixel may also be used for the user or the inspector as the optical effect. Accordingly, a direct optical measuring method may not be used. More specifically, in a color filter in which colored portions are provided in the form of a film, a method may, for example, be considered in which the thickness of each colored portion is measured, and the optical effect of entire pixels is calculated based on the result of the measurement.

Next, coloring conditions for each pixel to be finally corrected are determined. Namely, the relationship between the optical effect and the coloring conditions is obtained in advance, and coloring conditions to be corrected are determined based on this relationship, the design value of the optical effect, and coloring conditions for the reference color filter. The coloring conditions include, for example, in a process for forming a colored portion by supplying a portion to be colored with ink, the amount of ink to be supplied to each portion to be colored, the ratio of a coloring material in the ink, and the arrangement, the order of dropping, and the timing of each ink droplet.

Then, the distribution of the areas of the apertures of respective pixels of the reference color filter is obtained according to one of two methods, i.e., a method of actually measuring the area of each aperture, and a method of estimating the area of each aperture.

The method of measuring the area of each aperture includes two approaches. In one of the approaches, the shape of each aperture is measured by optical means, and the area of the aperture is calculated based on the result of the measurement. In another approach, the shape of each aperture is not measured, but the area of the aperture is directly obtained. In the second approach, for example, light having a constant radiation intensity is projected onto a region including the aperture. Light passing through the aperture is sensed by a photosensor, and the area of the aperture is obtained from the radiant flux of light incident upon the photosensor.

In the method of estimating the area of each aperture, when pixels colored with the same coloring conditions are clearly present within a colored region, the difference between the values of the optical effect of these pixels represents the difference between the areas of corresponding apertures. Hence, the areas of respective apertures can be estimated based on the difference in the values of the optical effect.

More specifically, when a region to be colored is divided into a plurality of scanning regions, and each of the scanning region is colored with the same conditions, on pixel colored with the same coloring conditions is present in each scanning region. The difference in the optical effect between pixels colored with the same conditions substantially represents the difference between the areas of the apertures of these pixels. Hence, the relative values of the areas of the apertures can be estimated. Furthermore, the difference in the optical effect between pixels colored with the same coloring conditions in adjacent scanning regions is considered to represent the difference between the areas of the apertures of these pixels, and the area of the aperture of a pixel positioned between these pixels can be estimated according to linear interpolation. In this case, by correcting the coloring conditions by appropriately measuring the optical effect of a pixel in a scanning region, appropriately selecting a pixel colored with the same coloring conditions in each scanning region and estimating the areas of the aperture of the pixel, and compensating the area of the aperture for correcting the coloring conditions, it is possible to improve unevenness in color due to the difference between the areas of apertures in each scanning region, particularly unevenness in color generated at the border of adjacent scanning regions.

The greatest feature of the present invention is to have a process of removing influence of the distribution of the areas of respective apertures on the measured values of the optical effect, and correcting coloring conditions for the succeeding color filter.

The design value of the area of the apeture of each pixel is compared with the actually measured or estimated value of the area of the aperture, and influence of the area of the aperture on the optical effect of the pixel is compensated. For that purpose, it is necessary to actually obtain or estimate the relationship between the area of the aperture and the optical effect.

In order to actually obtain the relationship, it is desirable to actually manufacture various substrates having different areas of apertures of a black matrix, manufacture color filters by coloring the substrates with constant coloring conditions, and measure the optical effect of each of the color filters.

In order to estimate the relationship, for example, the relationship between the optical effect and the area of the aperture is assumed to be linear. In another approach, when using the radiant flux of light passing through the aperture of each pixel illuminated with constant light as the optical effect, the amount of transmitted light is assumed to be proportional to the area of the apeture.

In calculation of compensating influence of the area of the actual aperture, a value obtained by dividing the measured or estimated area of the aperture by the design value of the area of the aperture is used as a correction coefficient, and influence of the area of the aperture is cancelled by correcting coloring conditions corrected based on the value of the optical effect by the correction coefficient. Any method of estimation may, of course, be adopted provided that the method has practically sufficient accuracy.

Usually, the same design value of the area of the apeture is used for all pixels. When the design value differs depending on pixels, it is desirable to obtain the amount of correction for coloring conditions based on the design value for each pixel. Actually, however, the speed of this step can be increased by using a representative amount, such as a mean value or the like, of design values for all or a part of pixels. When only a request for unevenness in color within a colored region is severe, and relatively wide error is allowed to an average density of coloring in the entire colored region, the mean value, the maximum value, the minimum value or the like of the areas of apertures of all or a part of pixels (including the case of only one pixel) may also be used instead of the design value.

According to the above-described process, coloring conditions for each pixel of the reference color filter are corrected after removing influence of the areas of apertures of pixels on the measured values of the optical effect, and the process of coloring a new color filter is performed with the corrected coloring conditions. The coloring conditions are corrected so that the area of the aperture of each pixel is constant within the colored region, and is optimum particularly in the case of a design value. Accordingly, in a color filter newly colored with the corrected coloring conditions, unevenness in color in the entire color filter is improved than in the reference color filter if the area of the aperture of the black matrix is constant. When the area of the apeture is constant and is substantially the same as the design value, an ideal color filter is obtained.

When influence of the distribution of the areas of apertures of the reference color filter is not removed, unevenness in color of a new color filter occurs in a state in which the distribution of the areas of apertures of the reference color filter is added to the distribution of the areas of apertures of the new color filter. According to the present invention, however, unevenness in color within a colored region is only caused by the distribution of the areas of apertures of the black matrix of the new color filter.

In the manufacturing method of the present invention, a method of coloring pixels of a color filter by forming colored portions by supplying portions to be colored on a transparent substrate with ink according to an ink-jet method is preferably used, because various coloring conditions, such as the amount of ink per unit area, the distribution of the amount of ink within a pixel, and the like, can be designed. More specifically, the color-filter manufacturing method according to the ink-jet method includes a first method of supplying a resin-composite layer having an ink absorbency with ink, and providing a colored portion by coloring the resin-composite layer, and a second method of supplying an aperture of a black matrix with ink, and providing a colored portion by curing the ink itself. Each of the two methods will now be described illustrating a preferable example.

First Method

More specifically, in the first method, it is preferable to form a black matrix, and a resin-composite layer, whose ink absorbency is increased or decreased by light irradiation, or light irradiation followed by heat treatment, on a transparent substrate, form portions to be colored having a high ink absorbency by performing light irradiation, or light irradiation followed by heat treatment on predetermined regions of the resin-composite layer, and portions not to be colored having a low ink absorbency than the portions to be colored, form colored portions by coloring the portions to be colored by supplying ink thereto according to an ink-jet method, and cure the entire resincomposite layer by performing light irradiation or heat treatment thereto.

FIGS. 8A–8F illustrate an example of processes of the first method. FIGS. 8A–8F are process diagrams when a resin composite whose ink absorbency is decreased (or disappears) by light irradiation, or light irradiation followed by heat treatment. Each of respective processes will now be described. FIGS. 8A–8F are scheamtic crosssectional views corresponding to the following processes (a)–(f), respectively.

Process (a)

A black matrix 42 is formed on a transparent substrate 41. Although. a glass substrate is usually used as the substrate 41, the substrate 41 is not limited to a glass substrate. Any other substrate may be used as the substrate 41 provided that it has necessary properties, such as transparency required for a color filter, the necessary mechanical strength, and the like.

The black matrix 42 may also be formed after forming a resin-composite layer 43 (to be described later), or formed on the resin-composite layer 43 after coloring it, without causing any problem. The black matrix 42 is usually formed by forming a metal film by means of sputtering or vacuum deposition, and then patterning the formed film according to photolithography. However, the method for forming the black matrix 43 is not limited to such an approach.

Process (b)

A resin composite, which is cured by light irradiation, or light irradiation followed by heat treatment and whose ink absorbency is decreased on portions irradiated by light, is coated on the substrate 41, to form the resin-composite layer 43 by performing prebaking if necessary. Although an acrylic resin, an epoxy resin, an amide resin or the like is used as a base-material resin for such a resin composite, the material is not limited to such a resin. In order to cause a cross-linking reaction by means of light, or light and heat, it is also possible to use a photo-initiator (a cross-linking agent). A bichromate, a bisazide compound, a radical-type initiator, a cation-type initiator, an aniontype initiator or the like may be used as the photo-initiator. It is also possible to mix some of these photo-initiators, or combine one of these photo-initiators with a sensitizer. It is also possible to use a photo-acid generating agent, such as an onium salt or the like, together with a cross-linking agent. In order to accelerate the cross-linking reaction, heat treatment may be performed after light irradiation.

The resin-composite layer 43 may be formed by means of a coating method, such as spin coating, roll coating, bar coating, spray coating, dip coating or the like. The coating method is not limited to a specific method.

Process (c)

By performing pattern exposure on the resin-composite layer 43 on regions where light irradiation is blocked by the black matrix 42 using a photo-mask 44, and then curing the exposed portions, the ink absorbency of the exposed portions is decreased, to form portions 45 not to be colored. Unexposed regions remain to have a high ink absorbency, to provide portions 46 to be colored. Although the portions 45 not to be colored are not always necessary, it is possible to prevent color mixture between adjacent colored portions by providing the portions 45 not be colored having a low ink absorbency between adjacent portions 46 to be colored. A photomask having apertures for curing light-blocking portions constituting the black matrix 42 is used as the photomask 44. In order to prevent decoloring at portions adjacent to the black matrix 42, it is preferable to use a mask having apertures narrower than the light-blocking width of the black matrix 42.

Process (d)

The portions 46 to be colored are supplied with ink 48 having R (red), G (green) and B (blue) colors in accordance with a predetermined coloring pattern from an ink-jet head 47, to form colored portions 49.

Dye-type or pigment-type ink may be used as the ink for coloring. The ink may be liquid or solid. When using water ink, the resin-composite layer 43 preferably has a high water absorbency. Not only ink which is liquid at the room temperature, but also ink which is solidified at a tempeture equal to or lower than the room temperature and is softened or liquidized at the room temperature may also be used. In the ordinary ink-jet method, ink itself is generally subjected to temperature control within a range of 30° C.–70° C. so that the viscosity of the ink is within a stable range. Hence, ink which is liquid during ink discharge is preferably used.

A bubble-jet-type head in which an electrothermal transducer is used as an energy generating element, a piezo-jet-type head using a piezoelectric element, or the like may be used in the ink-jet method, and an area to be colored and a coloring pattern may be arbitrarily set. In the present invention, an ink-jet head utilizing an electrothermal transducer is particularly preferable, because it is possible to freely change the size of ink droplets discharged from the ink-jet head, the number of ink droplets per unit area in a portion to be colored, the position where an ink droplet drops, and the like.

Process (e)

After drying the ink if necessary, the entire surface of the substrate 41 is irradiated with light in order to cure the colored portions 49. Heat treatment may be performed instead of light irradiation.

Process (f)

A protective layer 50 is formed if necessary. For example, a photo-curing, thermosetting, or photo-curing/thermosetting resin layer, or an inorganic film formed by means of vacuum deposition, sputtering or the like may be used as the protective layer 50. Any film which is transparent in the form of a color filter, and which is durable in the succeeding processes, such as forming of an ITO (indium tin oxide) film, forming of an orientation film, and the like, may be used.

When using a resin composite whose ink absorbency is increased (or appears) by light irradiation, or light irradiation followed by heat treatment, it is particularly preferable to use a system utilizing a reaction due to chemical amplification. A compound obtained by esterifying or blocking by acetyl groups or the like hydroxy groups of a cellulose derivative, such as hydroxypropyl cellulose, hydroxyethyl cellulose or the like (such as, a celluloseacetate-type compound or the like), a compound obtained by esterifying or blocking by acetyl groups or the like hydroxy groups of high molecular alcohol, such as polyvinyl alcohol or the like, or a derivative thereof (such as, a polyvinylacetate-type compound or the like), a compound obtained by blocking by trimethylsilyl groups or the like hydroxy groups of a novolak resin, such as cresol novolak or the like, polyparahydroxystyrene, or a derivative thereof, or the like may be used as the base-material resin. However, the base-material resin to be used in the present invention is not limited to such a compound.

In the present invention, in order to provide a substantial difference in ink absorbency by exposure, in general, the conversion ratio of functional groups convertible into hydrophilic groups into hydrophilic groups is preferably at least 30%. Spectral analysis utilizing IR (infrared rays), NMR (nuclear magnetic resonance) or the like is effective as a method for quantifying the hydrophilic groups.

An onium salt, such as triphenylsulfonium hexafluoroantimonate or the like, a halogenated organic compound, such as trichloromethyl triazine or the like, naphtoquinone diazide, or a derivative thereof is preferably used as the photo-initiator. However, the photo-initiator to be used in the present invention is not limited to such a compound, but any compound may be used provided that the ink absorbency of portions irradiated by light is increased by light irradiation, or light irradiation followed by heat treatment.

When using such a resin composite, it is also possible to expose regions other than regions blocked by the black matrix by using the black matrix formed on the transparent substrate as a mask, and performing exposure from the back of the substrate.

Second Method

FIGS. 9A–9D illustrate processes of the second method. In FIGS. 9A–9D, the same components as those shown in FIGS. 8A–8F are indicated by the same reference numerals. FIGS. 9A–9D are schematic cross-sectional views corresponding to the following processes (a)–(d), respectively.

Process (a)

First, a black matrix 51 is formed on a transparent substrate 41. The black matrix 51 also operates as a partition member for preventing color mixture of adjacent ink materials having different colors when supplying ink (to be described later). A resist containing a black pigment is apreferably used as the black matrix 51, and is patterned according to ordinary photolithography. In order to prevent the above-described color mixture, the black matrix 5 preferably has an ink repellent property. In the present invention, in order to provide the above-described partitioning and light blocking functions, the thickness of the black matrix 51 is preferably at least 0.5 $\mu$m. Apertures in the black matrix 51 serve as portions to be colored.

Process (b)

Ink materials 52 having R, G and B colors are provided in accordance with a predetermined coloring pattern from an ink-jet head 47 so as to fill apertures of the black matrix 51.

The ink used in the present invention comprises a resin compound which is cured by providing energy and which usually contains a coloring material. An ordinary dye or pigment may be used as the coloring material. For example, an anthraquinone dye, an azo dye, a triphenylmethane dye, a polymethine dye or the like may be used as the dye.

A resin which is cured by providing energy, such as heat treatment, light irradiation or the like, is used for the ink. More specifically, a combination of a known resin and a cross-linking agent may be used as a thermosetting resin. For example, an acrylic resin, a melamine resin, a mixture of a polymer containing hydroxyl groups or caroxyl groups and melamine, a mixture of a polymer containing hydroxyl groups or carboxyl groups and a multifunctional epoxy compound, a mixture of a polymer containing hydroxyl groups or carboxyl groups and a cellulose-reaction-type compound, a mixture of an epoxy resin and a resol resin, a mixture of an epoxy resin and an amine, a mixture of an epoxy resin and carboxylic acid or acid anhydride, an epoxy compound, or the like may be used as the thermosetting resin. A known resin, such as a commercially available negative resist, or the like, may be preferably used as the photo-curable resin.

Various solvents may also be added to the ink. From the viewpoint of ink dischargibility in the ink-jet method, a mixed solvent of water and a water-soluble organic solvent is preferably used.

In order to provide desired characteristics, it is also possible to add a surface-active agent, an antifoaming agent, an antiseptic agent, and the like in addition to the above-described components, if necessary. It is also possible to add, for example, a commercially available water-soluble dye, and the like.

A solvent other than water and water-soluble organic solvents may be used for a photo-curing or thermosetting resin from among the above-described resins which is not dissolved in water or water-soluble organic solvents, provided that the resin can be stably discharged. Particularly, when using a monomer which is cured by light, a nonsolvent-type resin obtained by dissolving a dye in the monomer may also be used.

Process (c)

The ink 52 provided in the apertures of the resin black matrix 51 is cured by heat treatment, light irradiaion, or light irradiation followed by heat treatment, to form colored portions 53.

Process (d)

A protective layer 50 is formed if necessary.

Figure 12:
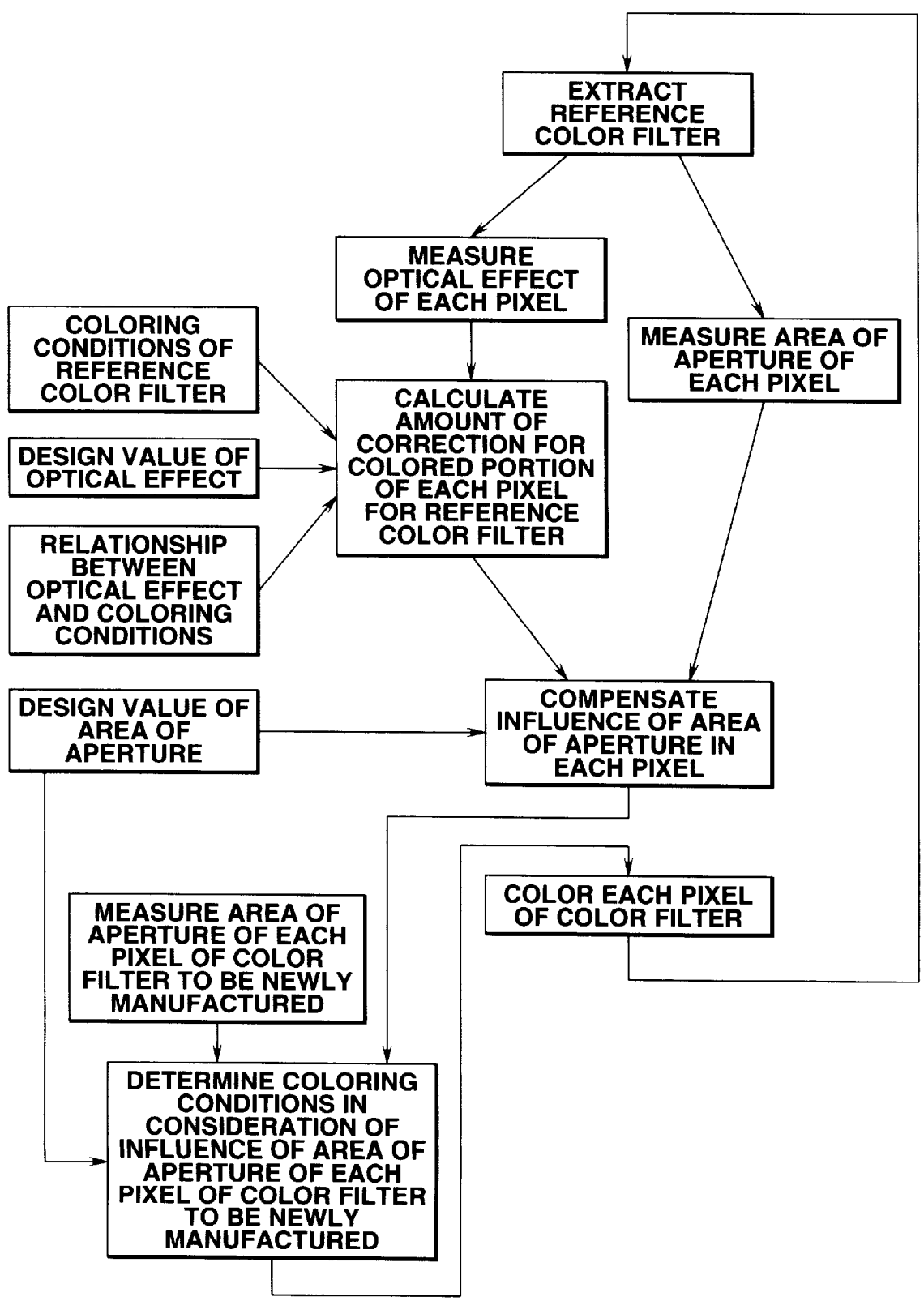
FIG. 12 is a flowchart illustrating the basic processes of a color-filter manufacturing method according to a second embodiment of the present invention.

As shown in FIG. 12, according to a second embodiment of the present invention, by taking into consideration of influence of the areas of apertures of a color filter to be newly manufactured, it is possible to obtain a color filter in which the optical effect of each pixel equals irrespective of the areas of the apertures.

Figure 13:
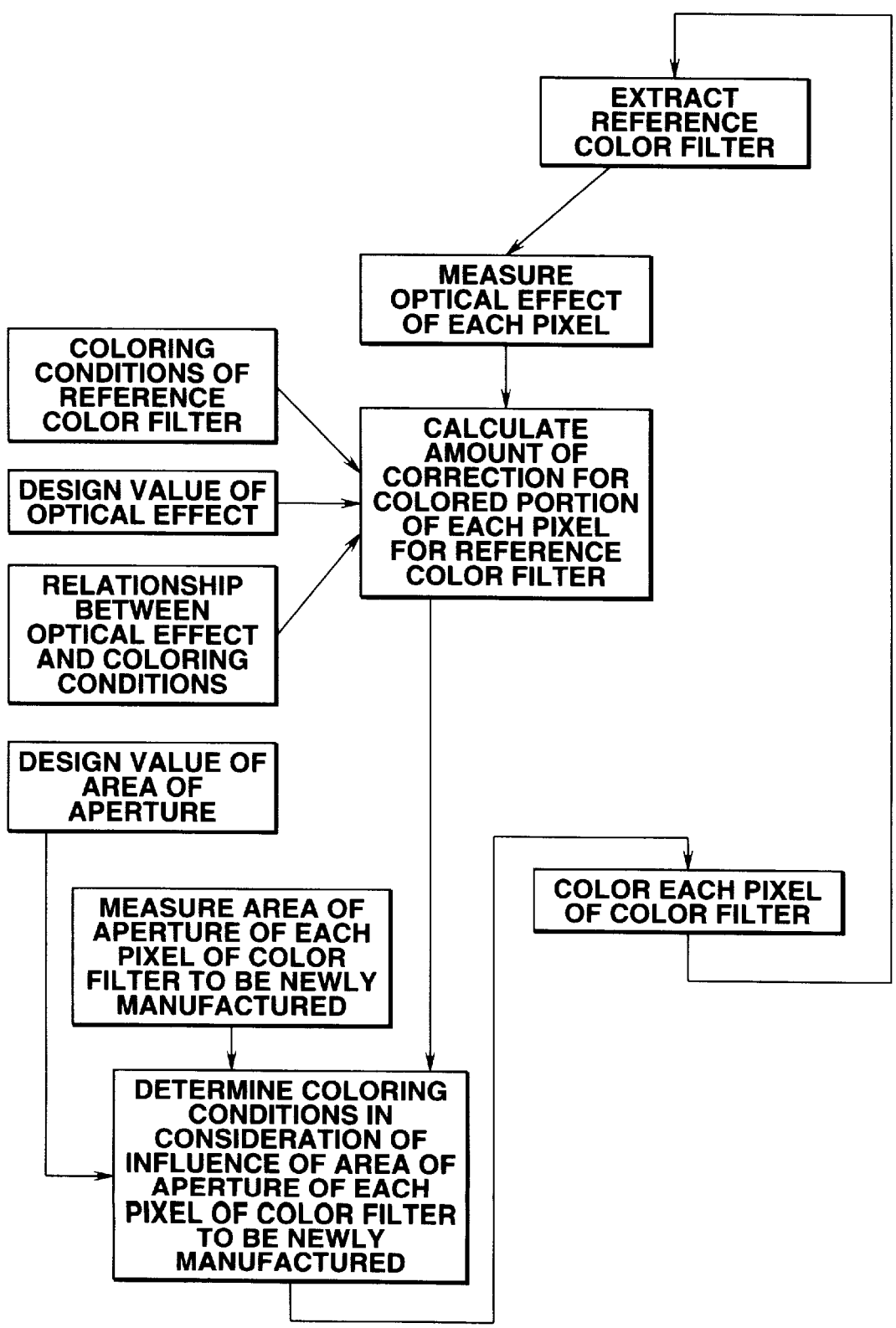
FIG. 13 is a flowchart illustrating the basic processes of a color-filter manufacturing method according to a third embodiment of the present invention.

As shown in FIG. 13, according to a third embodiment of the present invention, influence of the areas of apertures of a reference color filter is not removed while taking into consideration of influence of the areas of apertures of a color filter to be newly manufactured.

Figure 10:
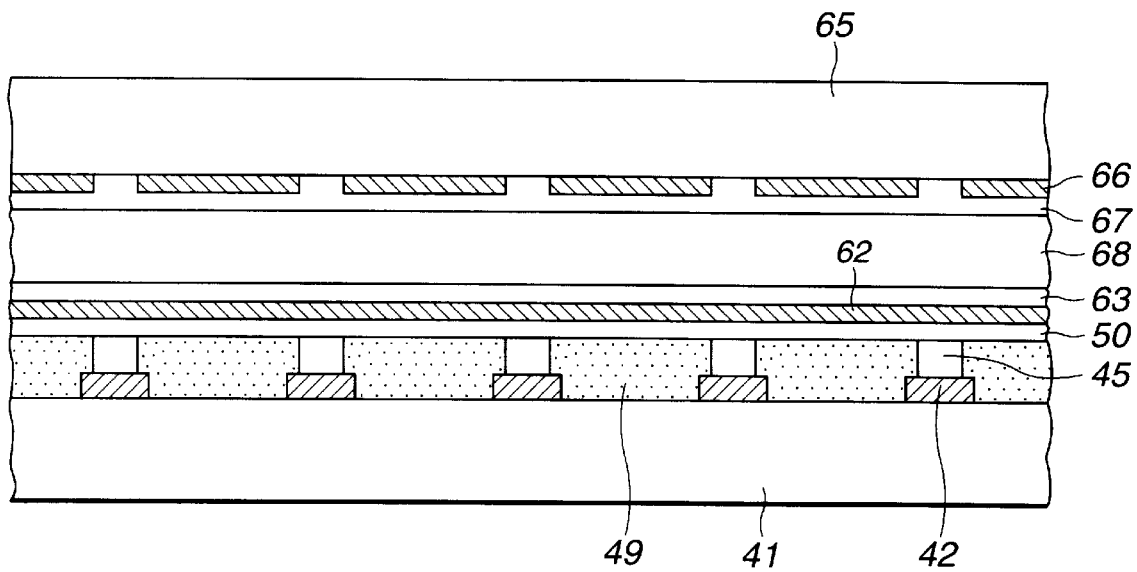
FIG. 10 is a schematic cross-sectional view illustrating a liquid-crystal device incorporating a color filter manufactured according to the processes shown in FIGS. 8A–8F.
Figure 11:
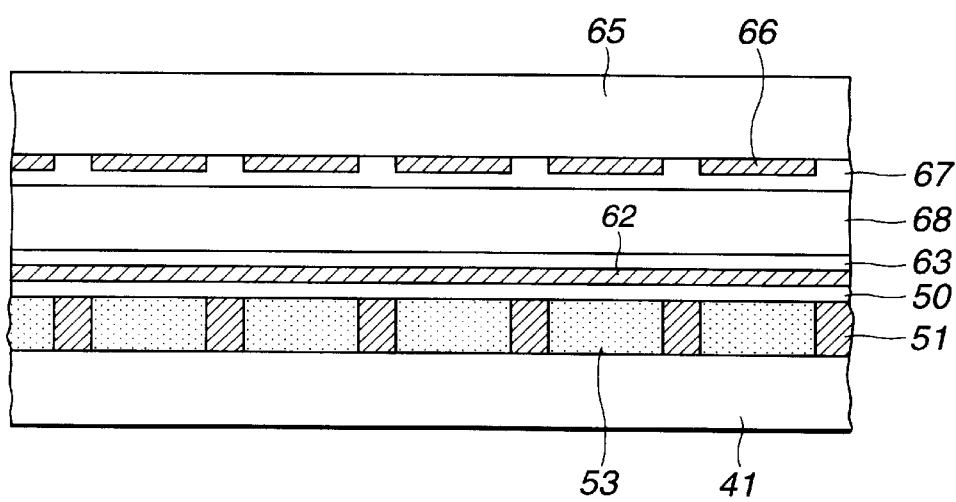
FIG. 11 is a schematic cross-sectional view illustrating a liquid-crystal device incorporating a color filter manufactured according to the processes shown in FIGS. 9A–9D.

Next, a description will be provided of a liquid-crystal device using a color filter according to the present invention. FIGS. 10 and 11 are schematic cross-sectional views of active-matrix liquid-crystal devices incorporating the color filters formed according to the processes shown in FIGS. 8A–8F and 9A–9D, respectively. In each of FIGS. 10 and 11, there are shown a common electrode 62, an orientation film 63, a substrate 65, pixel electrodes 66, an orientation film 67, and a liquid-crystal compound 68. In FIGS. 10 and 11, the same components as those shown in FIGS. 8A–8F and 9A–9D are indicated by the same reference numerals.

The liquid-crystal device for color display is usually formed by sealing the liquid-crystal compound 68 between the color-filter-side substrate 41 and the TFT (thin film transistor) substrate 65 assembled so as to face each other. TFTs (not shown) and the transparent pixel electrodes 66 are formed in the form of a matrix on the inner surface of the TFT substrate 65. The color-filter layer is provided on the inner surface of the substrate 41 so that R, G and B colored portions 49 or 53 are arranged at positions facing the pixel electrodes 66, and the transparent common electrode 62 is formed above the entire color-filter layer. The orientation films 63 and 67 are formed on the common electrode 62 and the pixel electrodes 66, respectively. By performing rubbing processing for the orientation films 63 and 66, liquid-crystal molecules can be aligned in a constant direction.

A polarizing plate (not shown) is bonded on the outer surface of each of the substrates 41 and 65. Display is usually performed by using a combination of a fluorescent lamp (not shown) and a scattering plate (not shown) as a backlight, and operating the liquid-crystal compound 68 as an optical shutter for changing transmittance for backlight light.

In the liquid-crystal device of the present invention, it is only necessary to use the color filter of the invention. A conventional technique for a liquid-crystal device may be applied to materials and manufacturing methods of other components.

EXAMPLE 1

In Example 1, color filters having an R, G and B stripe arrangement, in each of which 600 pixels in the vertical direction and 800 pixels in the horizontal direction (for each color) are formed in a colored region having a diagonal size of 12.1 inches (307 mm) using an ink-jet head using an electrothermal transducer, were manufactured. One of the manufactured color filters was extracted as a reference color filter.

Figure 2:
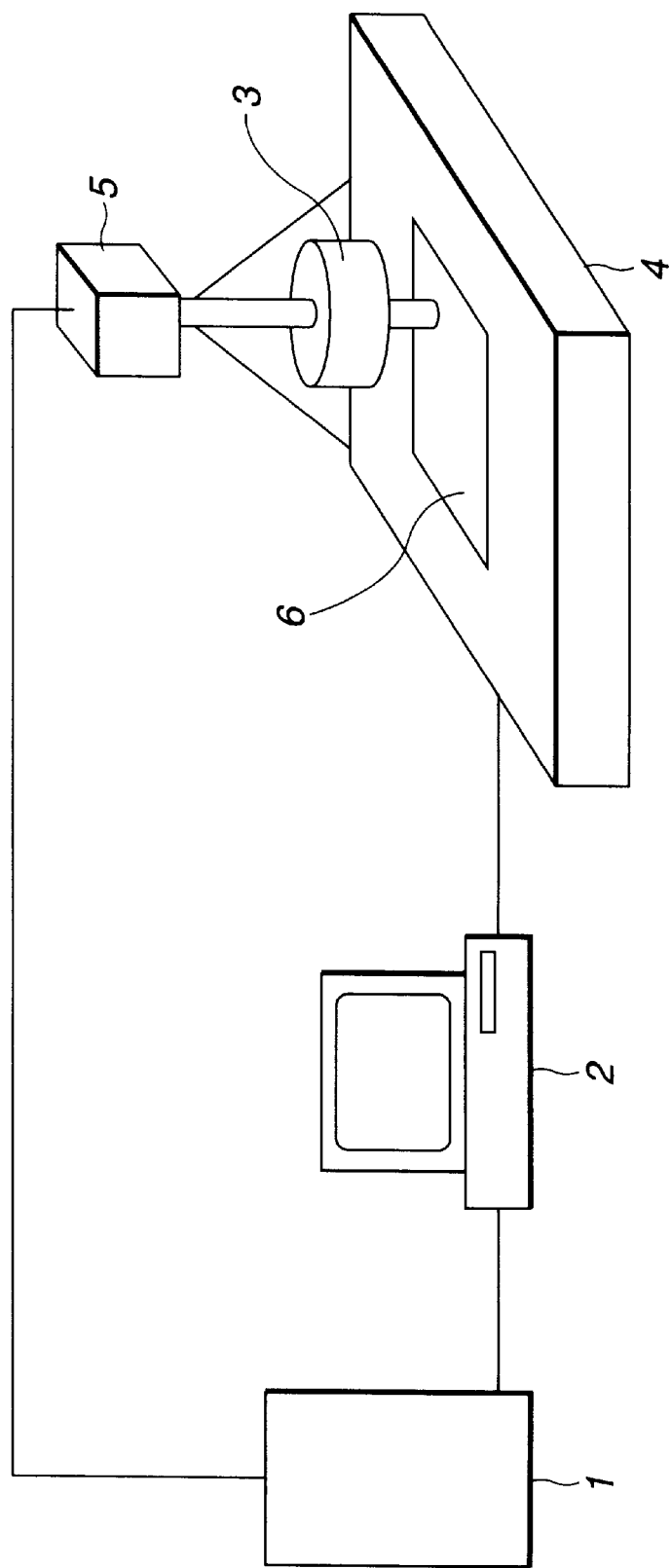
FIG. 2 is a perspective view illustrating an apparatus for measuring the optical effect and the area of each aperture of a filter manufactured according to the present invention.

The optical effect and the area of the aperture of each pixel were measured using an apparatus shown in FIG. 2. In FIG. 2, an image processing apparatus 1 receives an image signal from a CCD (charge-coupled device) camera, and substantially measures the optical effect and the area of the aperture of each pixel. A personal computer 2 controls the entire measuring apparatus, and derives coloring conditions for a new color filter from the measured optical effect and the measure area of the aperture of each pixel, and coloring conditions for the reference color filter. The personal computer 2 also communicates with a coloring apparatus (to be described later) in order to transmit the coloring conditions as an image to be drawn. An optical microscope 3 focuses the image of a reference color filter 6 illuminated by facing transparent illumination (not shown). An XY stage 4 can move an arbitrary pixel of the reference color filter 5 to a portion within the field of view of the optical microscope 3. A monochromatic CCD camera 5 converts the image focused by the optical microscope 3 into an electrical signal, and transmits the electrical signal to the image processing apparatus 1. A color CCD camera may also be used as the CCD camera 5. In order to obtain a sharp image, an autofocus device may be provided.

Figure 3:
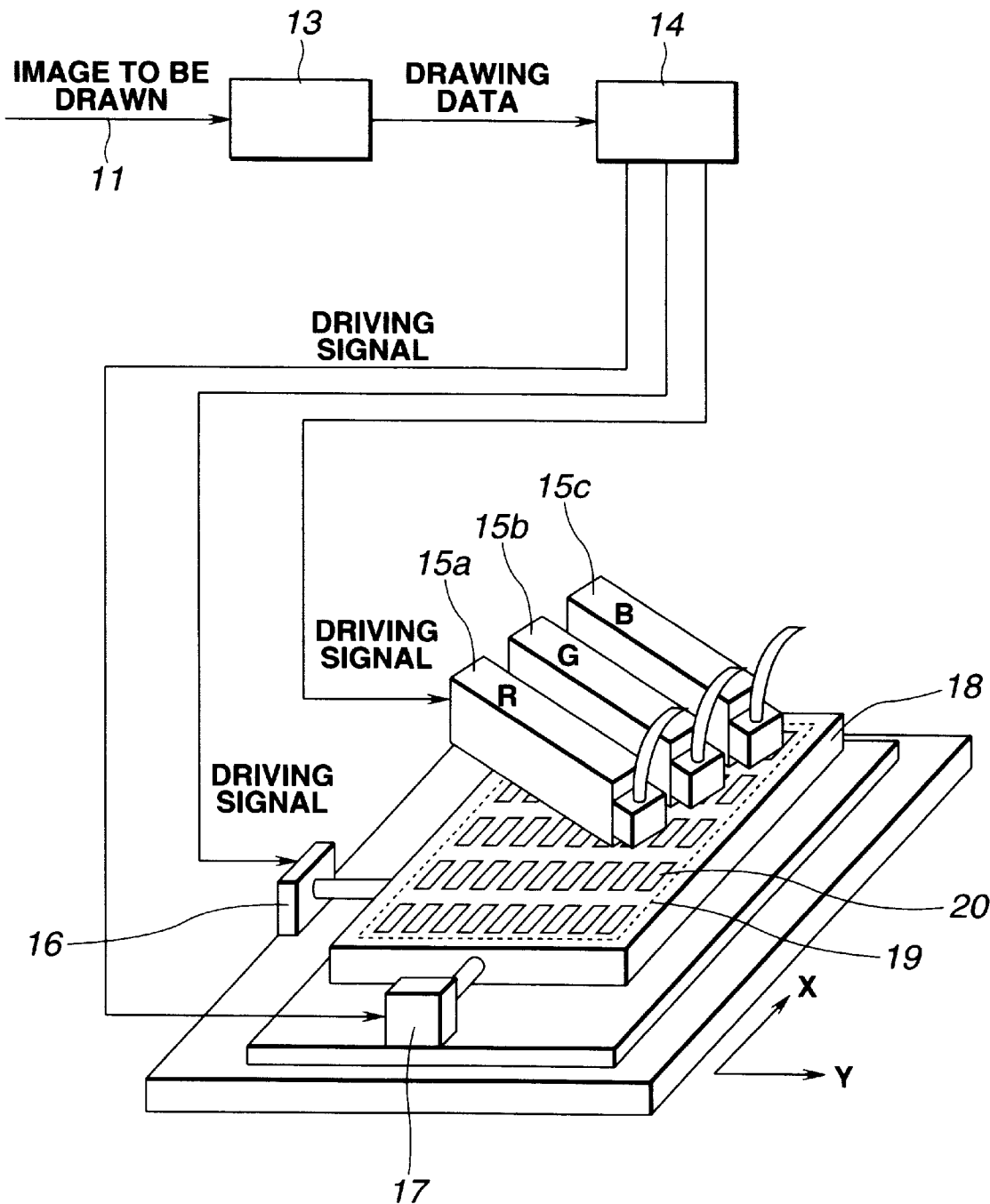
FIG. 3 is a perspective view illustrating a drawing apparatus used in the present invention.

The process for coloring the color filter was performed using a drawing apparatus shown in FIG. 3. In FIG. 3, an image to be drawn 11 represents the coloring conditions transmitted from the measuring apparatus (image processing apparatus) 1 shown in FIG. 2. A drawing-data generation device 13 generates respective signals for moving ink-jet heads and feeding devices (to be described below) in a linked state. Reference numerals 15a–15c represent ink-jet heads for R, G and B, respectively, each of which provides ink obtained by dissolving a dye of the corresponding color in a solvent. Feeding devices 16 and 17 change the relative position between a substrate 20 and the ink-jet heads 15a–15c by driving a stage 18 in cooperation with the ink-jet heads 15a–15c. It is thereby possible to color portions to be colored on the substrate 20 with predetermined coloring conditions. Reference numeral 19 represents a drawn pattern.

Figure 4:
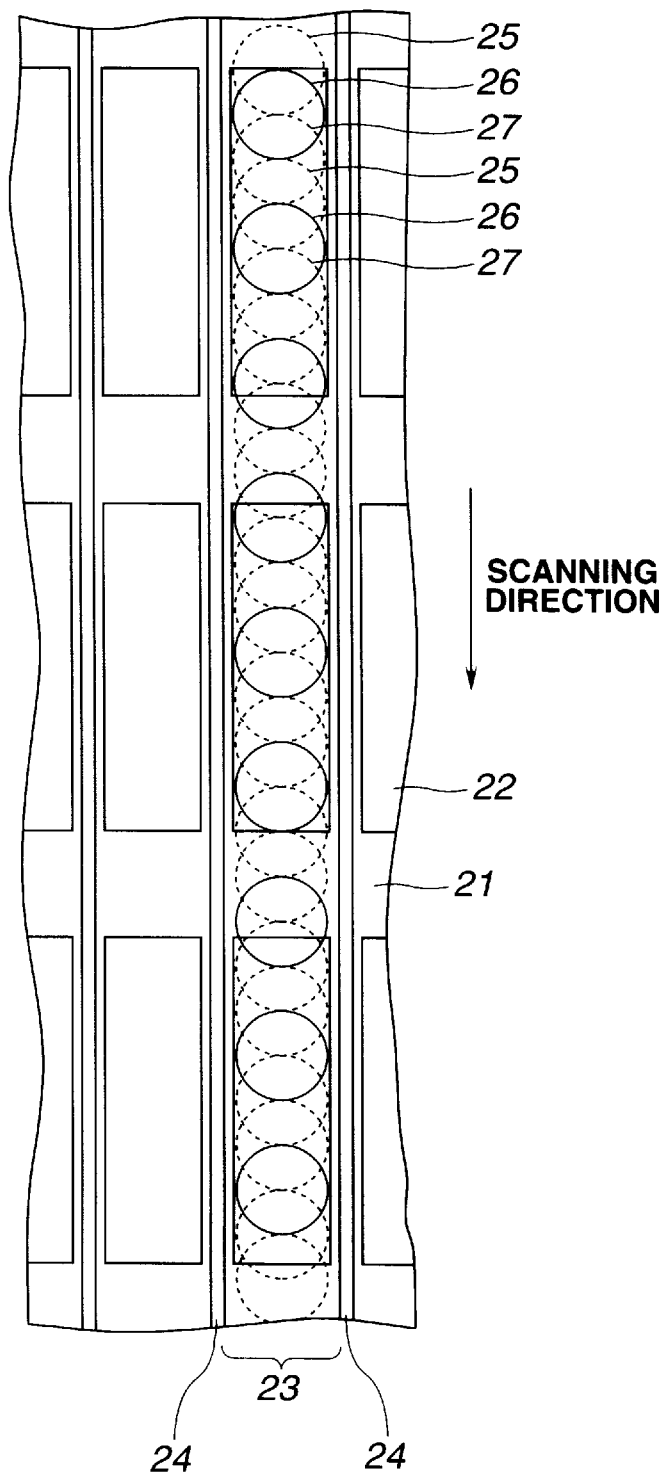
FIG. 4 is a plan view illustrating a state in which ink is provided on a substrate in the present invention.

The coloring conditions in Example 1 will now be described. In Example 1, the number of ink droplets per unit area is changed as the coloring conditions, as shown in FIG. 4. FIG. 4 illustrates a manner of supplying ink onto the substrate, as seen from above. In FIG. 4, a black matrix 21 is formed on the substrate. Reference numeral 22 represents an aperture of the black matrix 21. Reference numeral 23 represents a portion to be colored (corresponding to the portion 46 shown in FIGS. 8C and 8D). Reference numeral 24 represents a portion not to be colored having an ink-repellent property (corresponding to the portion 45 shown in FIGS. 8C–8F). Reference numerals 25–27 represent ink droplets. The ink droplets are supplied by at least one scanning operation. In Example 1, ink droplets were supplied by three scanning operations. Namely, the ink droplets 25 were intermittently dropped at the first scanning operation, each ink droplet 26 was dropped onto a position adjacent to the corresponding ink droplet 25 at the second scanning operation, and each ink droplet 27 was dropped so as to interconnect the ink droplets 25 and 26 at the third scanning operation. The ink droplets 25–27 may have different volumes. In Example 1, the interval between the ink droplets 25–27 was made a coloring condition to be corrected.

Correction of the coloring conditions will now be described. First, using the measuring apparatus shown in FIG. 2, the radiant flux passing through the aperture of each pixel of the reference color filter when illuminated with light having a constant irradiance was measured in advance as the optical effect of the pixel. The relationship between the rate of change of the radiant flux of light passing through the aperture of each pixel when illuminated with the light having the constant irradiance and the rate of change of the interval between the ink droplets was also obtained in advance. This relationship was obtained by preparing various samples having different intervals between ink droplets, and measuring the above-described radiant flux using the measuring apparatus shown in FIG. 2. The interval between ink droplets for realizing coloring without unevenness in color in a substrate having the same black matrix as that of the reference color filter was obtained from the obtained relationship between the rates of change, the radiant flux of light passing through the aperture of each pixel, the interval between ink droplets of the reference color filter, and the design value of the radiant flux of light passing through the aperture of each pixel.

However, the area of the aperture of each pixel is not always equal in the reference color filter and a substrate to be actually colored. Hence, there is the possibility that stronger unevenness in color may occur by such a method of controlling the coloring conditions.

Accordingly, the area of the aperture of each pixel of the reference color filter was measured using the measuring apparatus shown in FIG. 2. In the measurement, the border between the aperture and the black matrix for each pixel was obtained from a luminance signal representing the image of the pixel. More specifically, to which of the aperture and the black matrix each point belongs was determined using a constant threshold, and a point belonging to the aperture was specified. The border was specified as the result of the measurement, and the area of the aperture surrounded by the borders was obtained.

Then, influence of the area of the aperture of each pixel on the optical effect of the pixel was removed in the following manner, based on the result of the above-described measurement of the area of the aperture.

A value obtained by dividing the area of the aperture of the black matrix of each pixel by the design value of the area was used as a correction coefficient for compensating influence of the area of the aperture. The interval between ink droplets derived from the radiant flux of light passing through each pixel of the reference color filter was multiplied by the correction coefficient. The difference in the area of the aperture of the reference color filter is directly reflected on the interval between ink droplets directly derived from the measured radiant flux of light passing through each pixel. Accordingly, by multiplying the derived interval by the above-described correction coefficient, the rate of change of the radiant flux of light passing through each pixel due to the area of the aperture is cancelled, so that the interval between ink droplets is corrected so as to provide the optical effect corresponding to the designed area of the aperture.

EXAMPLE 2

In Example 2, by dividing a region to be colored into a plurality of scanning regions, and comparing the values of the optical effect of pixels having the same coloring conditions in adjacent scanning regions, coloring conditions were corrected by estimating the difference between the areas of the apertures of the black matrix of the pixels. In addition, by performing linear interpolation of coloring conditions for a pixel present between the pixels, unevenness in color influenced by the area of the aperture was improved.

As in Example 1, color filters having an R, G and B stripe arrangement in each of which 600 pixels in the vertical direction and 800 pixels in the horizontal direction (for each color) are formed in a colored region having a diagonal size of 12.1 inches (307 mm), were manufactured.

Figure 5:
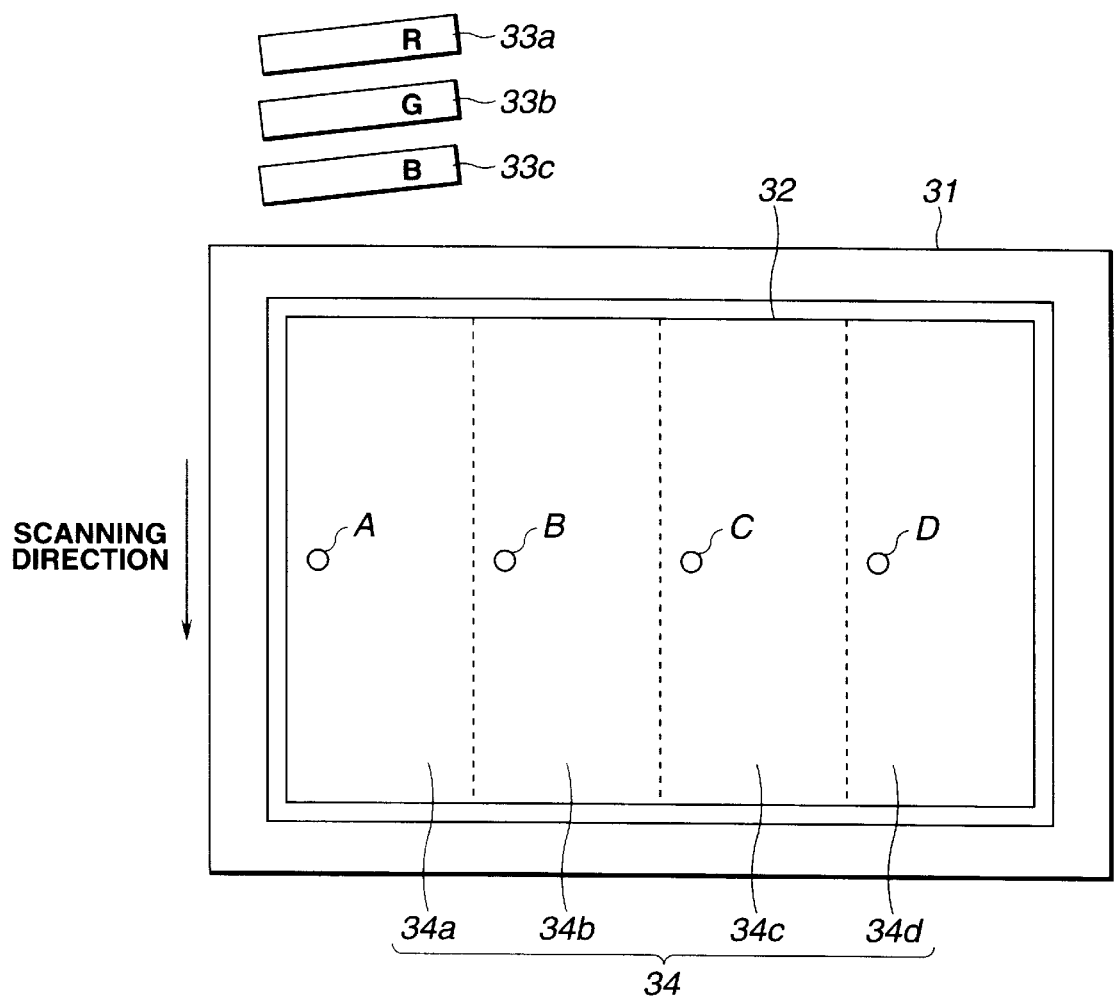
FIG. 5 is a plan view illustrating colored regions of a color filter manufactured according to the present invention.

FIG. 5 illustrates a manner of coloring a region to be colored of the color filter by dividing the region into a plurality of scanning regions in Example 2. In FIG. 5, reference numeral 31 represents a substrate constituting the color filter. Colored pixels are arranged in a colored region 32. The colored region 32 is divided into scanning regions 34a–34d. Each of ink-jet heads 33a–33c has 207 nozzles for a corresponding color, and supplies ink while scanning a corresponding scanning region in a scanning direction. A–D in FIG. 5 represent pixels provided with ink from the same nozzle.

Figure 6:
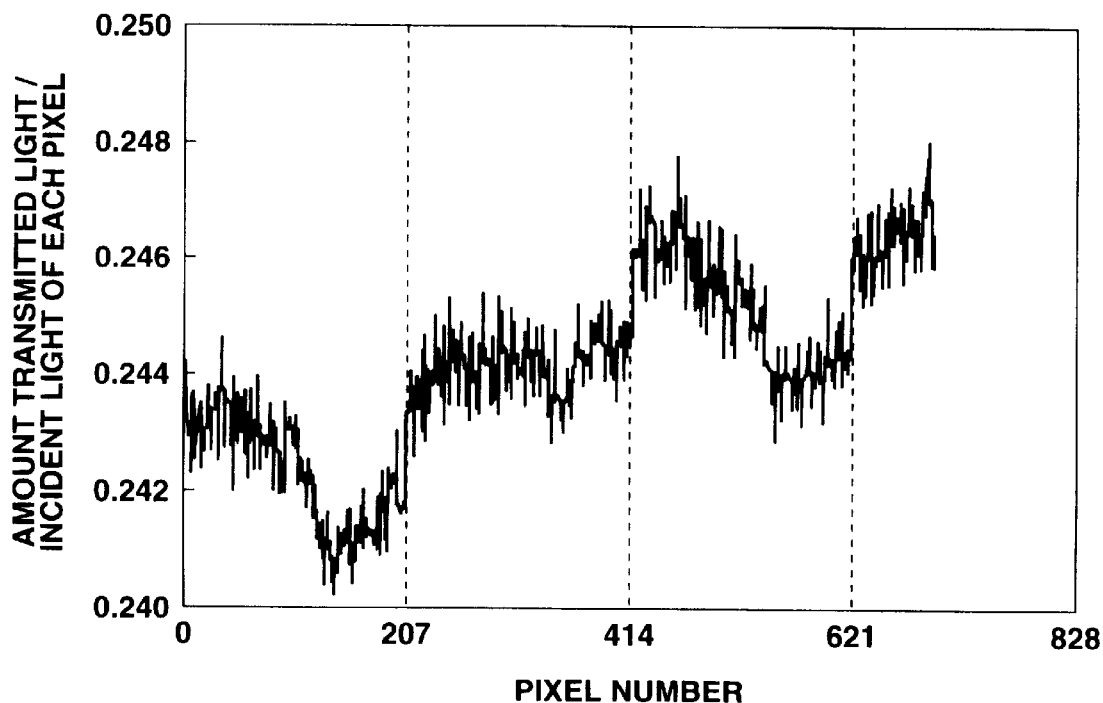
FIG. 6 is a diagram illustrating the optical effect of a color filter colored with coloring conditions corrected without compensating the areas of respective apertures in the present invention.

Since the pixels A–D are colored with the same coloring conditions, the radiant flux passing through the aperture of each of the pixels A–D when illuminated with light having a constant irradiance must originally have the same value. Actually, however, the value of the radiant flux differs due to the difference between the areas of the apertures of the black matrix. Accordingly, when the radiant flux passing through the apeture in only one scanning region was measured and coloring conditions of all of the scanning regions were corrected based on the measured value, the values of the optical effect of respective pixels of the color filter were as shown in FIG. 6. In this case, the amounts of transmitted light were measured only in a scanning region having pixel numbers 208–414. In FIG. 6, the abscissa represents the number of each pixel, and the ordinate represents a value obtained by dividing the radiant flux passing through the aperture of each pixel when illuminated with light having a constant irradiance by the amount of incident light. The abscissa in FIG. 6 represents positions in the lateral direction of the color filter shown in FIG. 5.

As is apparent from FIG. 6, according to this measuring method, although the optical effect is uniform within the region of pixel numbers 208–414, the optical effect is discontinuous at the border between scanning regions (between pixel numbers 207 and 208, 414 and 415, and 621 and 622), and is recognized by the user and the inspector as pronounced unevenness in color. The generation of such unevenness in color is caused by influence of the distribution of the areas of apertures 208–414 on the optical effect of the new color filter because the distribution of the areas of apertures of the black matrix in the measured region having pixel numbers 208–414 is not compensated.

Accordingly, in FIG. 5, the radiant flux of light passing through each pixel was measured for respective 30 pixels having pixel numbers 208–237 and pixel numbers 415–444.

The difference between the obtained radiant flux of light passing through each pixel having pixel numbers 415–444 and the obtained radiant flux of light passing through a corresponding pixel separated by 207 pixels from that pixel (i.e., the difference between the radiant fluxes passing through pixels supplied with ink from the same nozzle) was obtained, and the mean value of the values of respective differences between radiant fluxes passing through 30 pairs of pixels was obtained. A value obtained by dividing the mean value by 207 is represented by A. Then, by adding the following correction value of the amount of light obtained by multiplying the above-described value A by the position of each pixel from pixel number 208 to 414 to the amount of light passing through the pixel, the radiant flux of light passing through the pixel is subjected to linear interpolation making the central pixel 311 of that region a reference pixel:

The correction value of the amount of light=A×(the pixel number–311)

As a result, the influence of the distribution of the areas of apertures is removed from the radiant flux of light passing through each pixel from pixel number 208 to 414. Accordingly, by correcting coloring conditions for each pixel within the concerned region based on the corrected radiant flux, unevenness in color within each scanning region and unevenness in color at the border between adjacent scanning regions are improved. Although in the above-described correction, the pixel having pixel number 311 is made the reference pixel, any pixel from pixel number 208 to 414 may be made a reference pixel. Furthermore, the mean value of all or a part of these pixels may be used. In addition, the design value for the radiant flux of light passing through the concerned pixel may be used.

Figure 7:
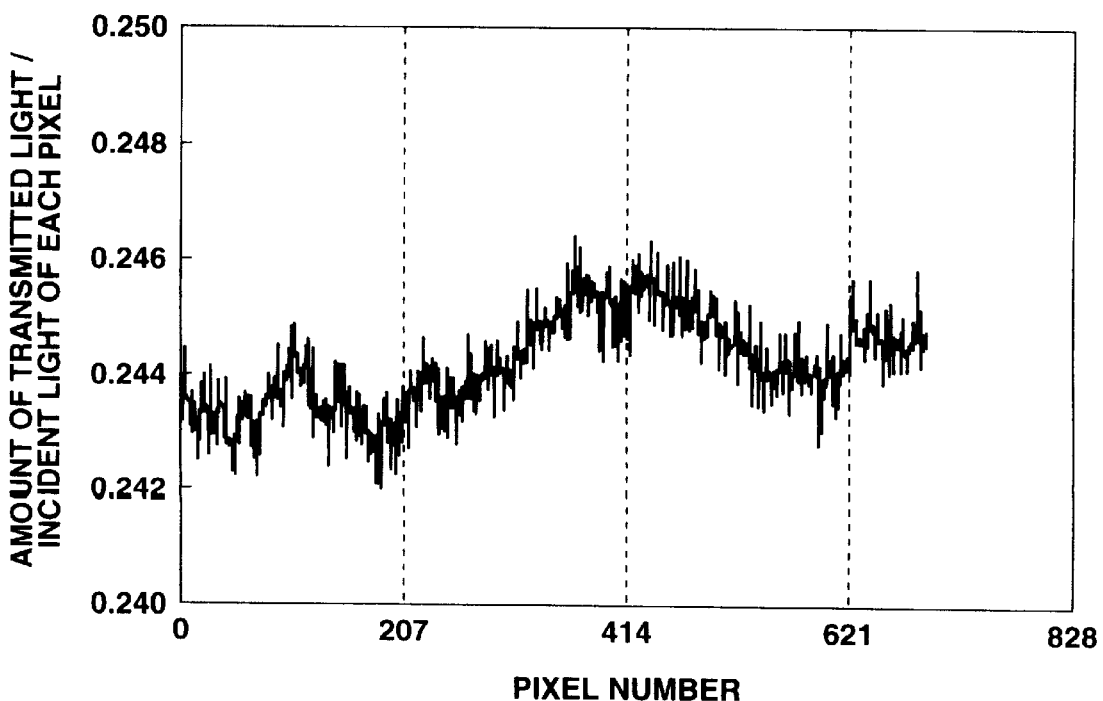
FIG. 7 is a diagram illustrating the optical effect of a color filter colored with coloring conditions corrected by compensating the areas of respective apertures in the present invention.
Figure 8A:
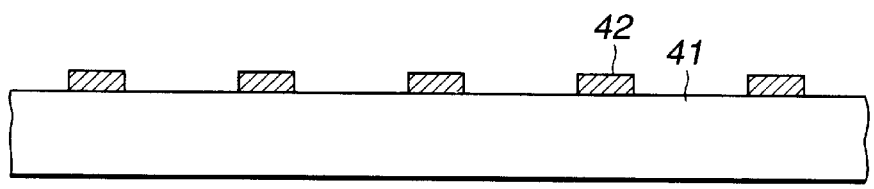
FIGS. 8A–8F are diagrams illustrating a color-filter manufacturing method using an ink-jet method according to a first method of the present invention.
Figure 8B:
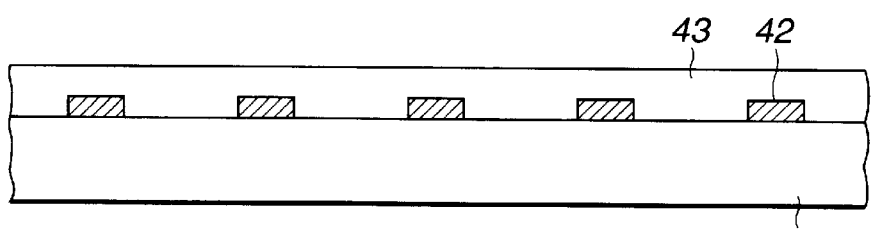
Figure 8C:
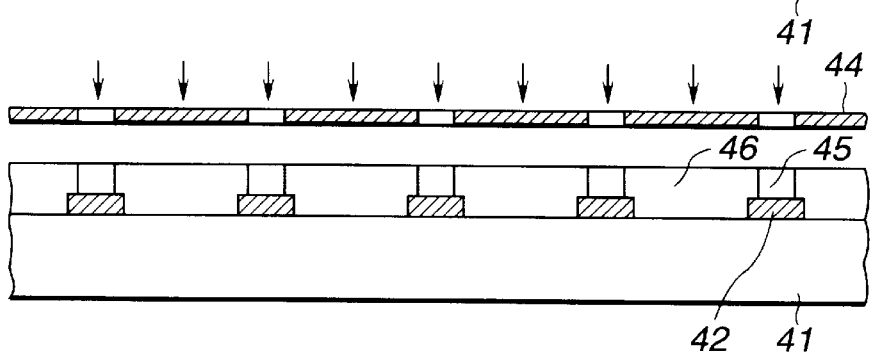
Figure 8D:
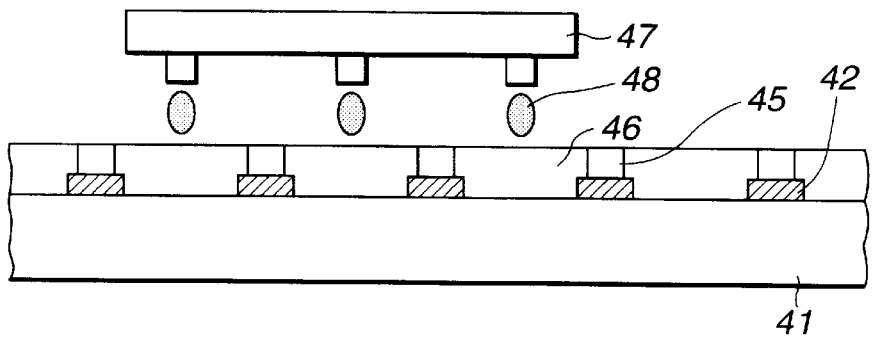
Figure 8E:
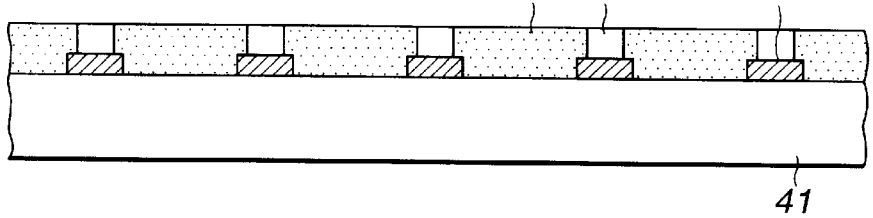
Figure 8F:
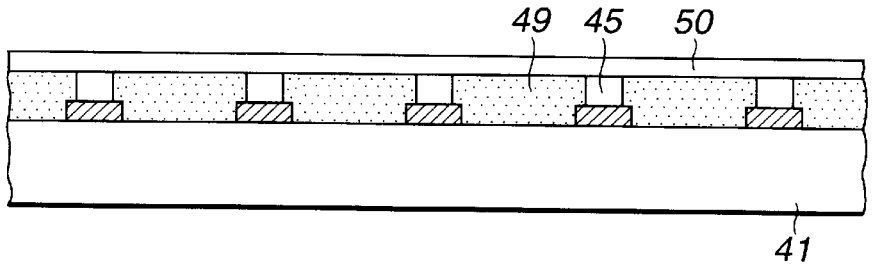
Figure 9A:
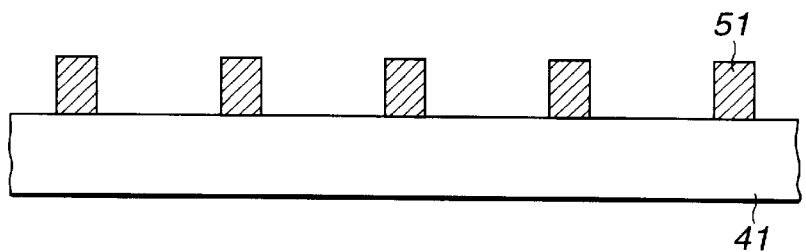
FIGS. 9A–9D are diagrams illustrating a color-filter manufacturing method using an ink-jet method according to a second method of the present invention.
Figure 9B:
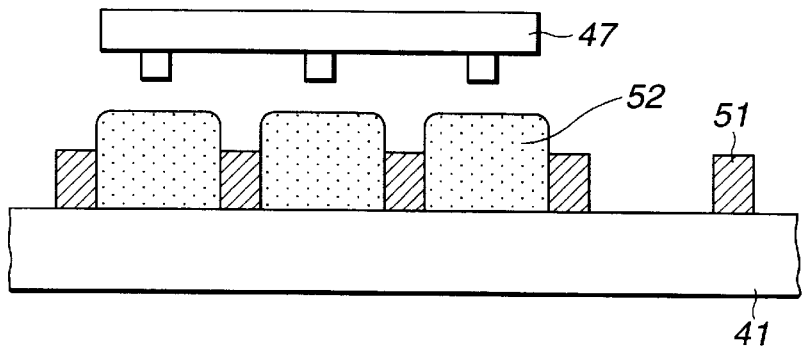
Figure 9C:
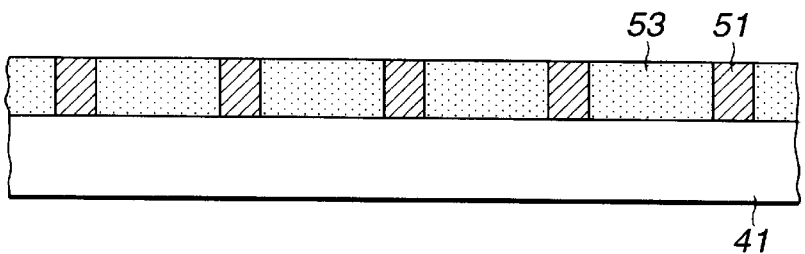
Figure 9D:
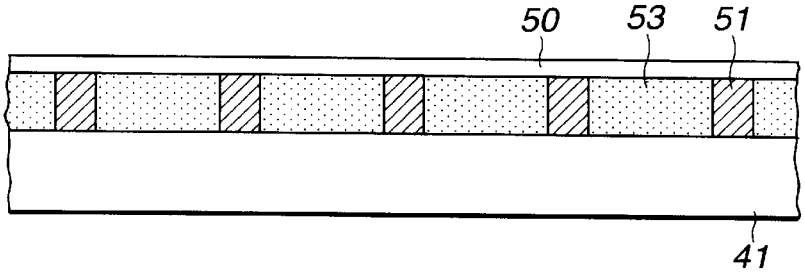

As described above, coloring of a new color filter was performed after performing correction of removing influence of the distribution of the areas of apertures. The value of the optical effect of each pixel of the obtained color filter is shown in FIG. 7. As is apparent from FIG. 7, it can be understood that unevenness in color in the borders of respective adjacent regions, and unevenness in color within respective scanning regions having pixel numbers 1–207, 415–621, and 622—which cause problems in FIG. 6 are improved.

A plurality of color filters were manufactured according to the manufacturing method of one of the embodiments, and sensory evaluation by a skilled inspector was performed for the manufactured filters. The results of the evaluation indicate that unevenness in color was not recognized at all or was recognized only to a degree of causing no practical problem in the inspected filters.

We also found that there is correlation between "unevenness in color is not recognized at all or is recognized only to a degree of causing no practical problem" and "a deviation of the area of the aperture from an estimated value", and a critical point where unevenness in color is not recognized at all.

Color filters having various values of deviation of the area of the aperture from an estimated value were manufactured according to the procedure of one of the above-described embodiments by using substrates having a distribution of various areas of apertures, and the values of deviation were compared with the results of sensory evaluation by the skilled inspector. The results of the comparison are shown in the following table.

In the following table, the difference between the estimated value and the actual value of the area of the aperture is obtained for each pixel, and the maximum value of the differences is divided by the area of the aperture, and the obtained value is represented by a percentage. In the following table, the results are arranged such that as the number of experiment increases, the difference between the estimated value and the actual value of the area of the aperture increases.

| Number of experiment | Difference between the estimated value and the actual value of the area of the aperture | Result of sensory evaluation |
| --- | --- | --- |
| 1 | 0.36% | A |
| 2 | 0.38% | A |
| 3 | 0.38% | A |
| 4 | 0.39% | A |
| 5 | 0.40% | A |
| 6 | 0.42% | A |
| 7 | 0.42% | B |
| 8 | 0.43% | A |
| 9 | 0.43% | A |
| 10 | 0.43% | A |
| 11 | 0.43% | A |
| 12 | 0.44% | A |
| 13 | 0.44% | A |
| 14 | 0.46% | A |
| 15 | 0.47% | B |
| 16 | 0.48% | A |
| 17 | 0.48% | A |
| 18 | 0.51% | A |
| 19 | 0.52% | B |

A: Unevenness in color is not recognized at all
B: Unevenness in color is recognized to a degree of causing no practical problem.

It can be understood from the above-described table that, when the difference between the estimated value and the actual value of the area of the aperture is equal to or less than 0.51%, color filters in which "unevenness in color is not recognized" are obtained. When the difference is equal to or less than 0.40%, "unevenness in color is not recognized" in all color filters. It can be said from the obtained results that, in the method of estimating the distribution of the areas of the apertures of pixels, the difference between the estimated value and the actual value of the area of the apeture is desirably equal to or less than 0.51%, and more desirably, equal to or less than 0.40%.

According to the present invention, unevenness in color due to the distribution of the areas of apertures of the black matrix can be improved. Hence, even if the area of the aperture of the black matrix differs between substrates or within a substrate, it is possible to manufacture a color filter having less unevenness in color with a high production yield. Accordingly, it is possible to provide a liquid-crystal device providing excellent color display using such a color filter with a low cost.

The individual components shown in outline in the drawings are all well known in the color-filter manufacturing method and liquid-crystal device arts and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method for manufacturing a color filter including a black matrix having apertures, and pixels obtained by coloring the aperatures on a substrate, said method comprising the step of:

correcting coloring conditions for the color filter based on a distribution of areas of the respective apertures.

2. A method according to claim 1, wherein the distribution of the areas of the respective apertures comprises a distribution of areas of respective apertures of a reference color filter.

3. A method according to claim 1, wherein the distribution of the areas of the respective apertures comprises a distribution of areas of respective apertures of a color filter to be newly manufactured.

4. A method according to claim 1, wherein the coloring conditions are corrected so that an optical effect of each of the pixels is uniform when the area of the aperture is constant.

5. A method according to claim 4, wherein the optical effect comprises a radiant flux of light passing through each of the apertures when illuminating the color filter with a uniform irradiance.

6. A method according to claim 1, wherein the distribution of the areas of the respective apertures is obtained by measuring the areas of the respective apertures.

7. A method according to claim 1, wherein the distribution of the areas of the respective apertures is estimated by dividing a colored region of a reference color filter into a plurality of scanning regions, coloring each of the scanning regions with the same conditions, and comparing measured values of an optical effect of pixels having the same coloring conditions present in the respective scanning regions.

8. A method according to claim 7, wherein the measured values of the optical effect of pixels having the same coloring conditions present in adjacent scanning regions are compared with each other, a distribution of areas of respective apertures of the pixels is estimated from the measured values, and an area of an aperture of a pixel present between the pixels is determined according to linear interpolation.

9. A method according to claim 7 or 8, wherein the difference between an estimated value and an actual value of the distribution of the areas of the respective apertures is equal to or less than 0.51% of the actual value.

10. A method according to any one of claims 1–8, wherein a process of coloring the pixels of the color filter comprises a process of supplying the substrate with ink-according to an ink-jet method.

11. A method according to claim 10, wherein the coloring conditions are corrected by changing an amount of the supplied ink.

12. A method according to claim 10, wherein the ink is supplied to portions to be colored within a resin-composite layer.

13. A method according to claim 12, wherein portions not to be colored are present between the portions to be colored.

14. A method according to any one of claims 1–8 wherein ink is supplied into the apertures on the substrate according to an ink-jet method, and the supplied ink is then cured.

15. A liquid-crystal device comprising:

a color filter manufactured by a method according to any one of claims 1–8;

a facing substrate facing said color filter; and a liquid crystal sealed between said color filter and said facing substrate.

16. A method according to claim 9, wherein a process of coloring the pixels of the color filter comprises a process of supplying the substrate with ink according to an ink-jet method.

17. A method according to claim 16, wherein the coloring conditions are corrected by changing an amount of the supplied ink.

18. A method according to claim 16, wherein the ink is supplied to portions to be colored within a resincomposite layer.

19. A method according to claim 18, wherein portions not to be colored are present between the portions to be colored.

20. A method according to claim 9, wherein ink is supplied into the apertures on the substrate according to an ink-jet method, and the supplied ink is then cured.

21. A liquid-crystal device comprising:

a color filter manufactured by a method according to claim 9;

a facing substrate facing said color filter; and a liquid crystal sealed between said color filter and said facing substrate.

* * * * *

UNITED STATES PATENT AND TRADEMARK OFFICE
CERTIFICATE OF CORRECTION

PATENT NO. : 6,232,022 B1
DATED : May 15, 2001
INVENTOR(S) : Hiroshi Fujiike et al.

It is certified that error appears in the above-identified patent and that said Letters Patent is hereby corrected as shown below:

Column 1,
Line 28, "uiformly" should read -- uniformly --; and
Line 50, "occur" should read -- to occur --.

Column 3,
Line 7, "diagram" should read -- chart --; and
Line 11, "diagram" should read -- chart --.

Column 4,
Line 37, "region" should read -- regions --; and
"on pixel" should read -- a pixel --.

Column 5,
Line 34, "request" should read -- demand --; and
Line 51, "than" should read -- more than --.

Column 6,
Line 23, "low" should read -- lower --; and
Line 38, "Although." should read -- Although --.

Column 7,
Line 35, "tempeture" should read -- temperature --.

Column 8,
Line 23, "into hydrophilic groups" should be deleted; and
Line 53, "apreferably" should read -- preferably --.

Column 10,
Line 5, close up right margin; and
Line 53, "filter 5" should read -- filter 6 --.

Column 12,
Line 7, "on-the" should read -- on the --.

UNITED STATES PATENT AND TRADEMARK OFFICE
CERTIFICATE OF CORRECTION

PATENT NO.    : 6,232,022 B1
DATED         : May 15, 2001
INVENTOR(S)   : Hiroshi Fujiike et al.

It is certified that error appears in the above-identified patent and that said Letters Patent is hereby corrected as shown below:

Column 15,
Line 26, "aperatures" should read -- apertures --.

Column 16,
Line 14, "ink-according" should read -- ink according --;
Line 23, "claims 1-8" should read -- claims 1-8, --; and
Line 40, "resincomposite" should read -- resin-composite --.

Signed and Sealed this

Fifth Day of March, 2002

Attest:

Attesting Officer

JAMES E. ROGAN
Director of the United States Patent and Trademark Office